United States Patent [19]

Go

[11] 4,396,228

[45] Aug. 2, 1983

[54] INTEGRATED SHOULDER HARNESS AND LAP BELT RESTRAINT APPARATUS

[75] Inventor: Dee L. Go, Seattle, Wash.

[73] Assignee: The Boeing Company, Seattle, Wash.

[21] Appl. No.: 181,170

[22] Filed: Aug. 25, 1980

[51] Int. Cl.³ .................. A62B 35/00; B60R 21/00; A47C 31/00

[52] U.S. Cl. ................ 297/484; 244/122 B; 280/801; 297/468

[58] Field of Search ............ 297/468, 476, 477, 478, 297/481, 465, 484, 483; 242/107.1, 107.13, 107.12, 107.3; 244/122 B; 128/133; 280/808, 801

[56] References Cited

U.S. PATENT DOCUMENTS

| | | | |
|---|---|---|---|
| 1,898,090 | 2/1933 | Lethern | 297/484 |
| 2,542,248 | 2/1951 | Heffernan et al. | 244/122 B |
| 2,576,867 | 11/1951 | Wilson | 297/484 |
| 2,710,649 | 6/1955 | Griswold et al. | 297/483 |
| 2,898,976 | 8/1959 | Barecki | 297/481 X |
| 3,162,485 | 12/1964 | Pragnell | 297/484 |
| 3,261,568 | 7/1966 | McFarlane et al. | 297/478 X |
| 3,512,830 | 5/1970 | Norman et al. | 297/484 X |
| 3,888,509 | 6/1975 | Willey | 297/484 X |
| 3,954,280 | 5/1976 | Roberts et al. | 280/808 X |
| 4,099,778 | 7/1978 | Lehr | 297/484 X |
| 4,175,787 | 11/1979 | Muskat | 297/484 |
| 4,231,616 | 11/1980 | Painter | 297/481 |

FOREIGN PATENT DOCUMENTS

| | | | |
|---|---|---|---|
| 2813888 | 10/1979 | Fed. Rep. of Germany | 280/801 |
| 930802 | 7/1963 | United Kingdom. | |

*Primary Examiner*—James T. McCall

*Attorney, Agent, or Firm*—Christensen, O'Connor, Johnson & Kindness

[57] ABSTRACT

To provide effective body restraint together with rapid egress under emergency conditions, an integrated shoulder harness and lap belt restraint apparatus is disclosed having two shoulder straps of webbing attached to an upper anchor point and extended therefrom over opposite shoulders of an occupant, through shoulder strap length adjusters, and then downwardly along the sides of an occupant's upper torso to side anchors located adjacent the opposite sides of the seat pan. Each strap webbing is looped through a friction fitting at the corresponding side anchor and is then extended inwardly to a lap buckle having webbing length adjusters on each of the complementary, interconnecting buckle parts. The inwardly extending portions of the continuous lengths of webbing are first threaded through the respective adjusters on the corresponding buckle parts and are then doubled back beneath the first mentioned webbing portions so as to extend outwardly toward the opposed side anchors where the ends of the webbing portions are fixedly attached to provide a doubled webbing lap belt. The restraint apparatus is snugged by fastening the lap buckle and then pulling outwardly on the first lap belt webbing portions until the underlying webbing portions are tensioned about the lap. Then the shoulder strap adjusters are tightened to take up any slack in the first portions of webbing by pulling the slack through the friction fittings on the side anchors. For quick egress, the lap buckle is released to free the pelvis and at the same time create sufficient slack in the shoulder harness to free the shoulders by slippage of the continuous lengths of webbing through the side anchor fittings.

5 Claims, 3 Drawing Figures

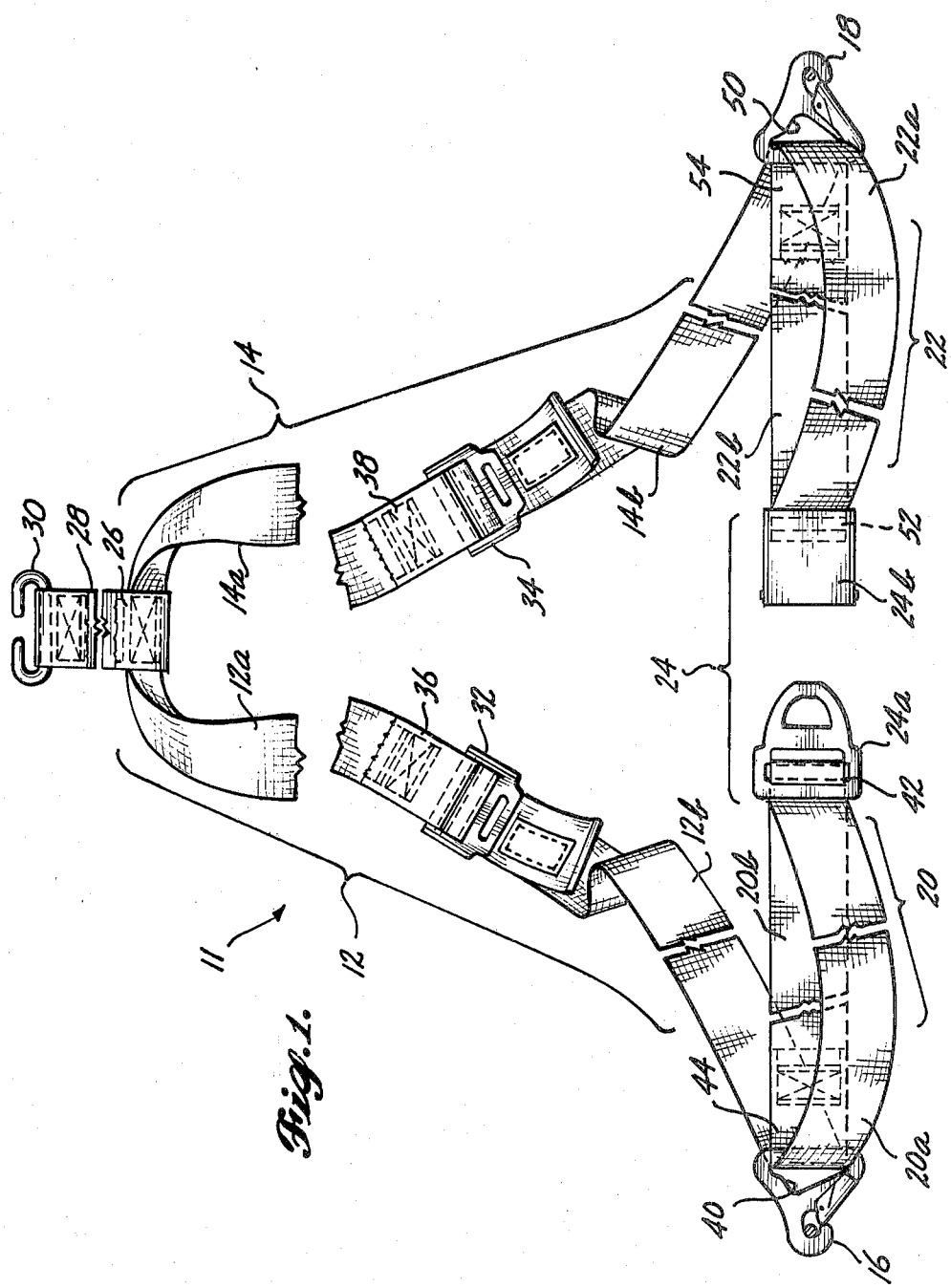

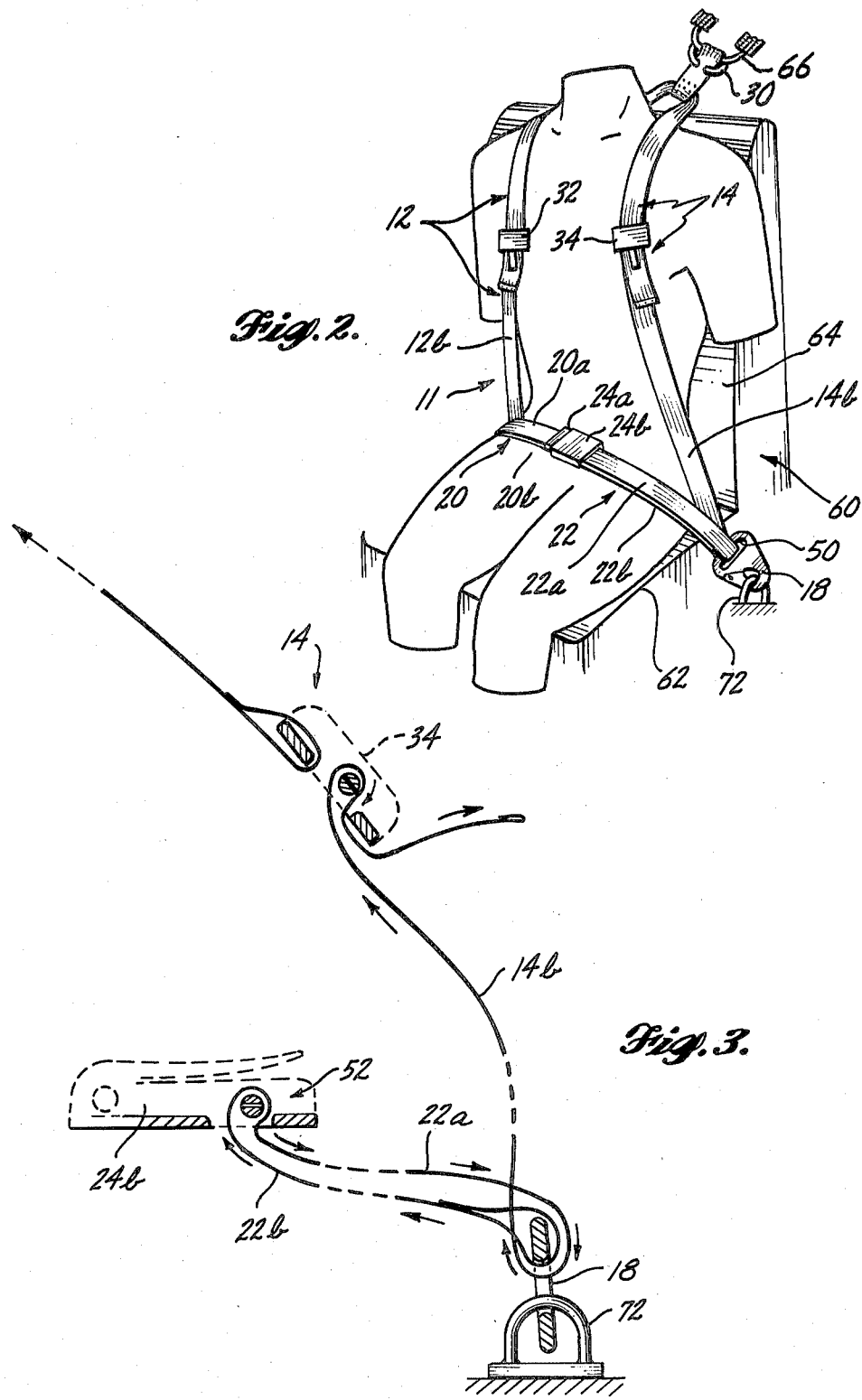

INTEGRATED SHOULDER HARNESS AND LAP BELT RESTRAINT APPARATUS

BACKGROUND OF THE INVENTION

The invention relates to shoulder harness and lap belt restraints of the type having a pair of shoulder straps anchored behind the head and extending down over the occupant's shoulders to lower, side anchor points adjacent opposite sides of the seat pan, and having a lap belt extending from one side anchor to the other across the occupant's lap. More particularly, the invention relates to restraints of the foregoing type in which the shoulder straps and lap belt are integrated by using a common length or lengths of webbing for both the lap belt and shoulder straps.

While existing restraint system for automobile, aircraft and other vehicles have undoubted value in increasing of the safety of travel, recent studies have been undertaken to make improvements, if possible, to available restraint equipment. One such study, conducted with respect to restraint systems used by flight attendants on commercial carriers, has indicated that a combined shoulder harness and lap belt restraint characterized by five or six anchor points is quite effective, in minimizing the potential for severe bodily injury, when compared with a number of other commonly used restraints.

The five/six point anchor systems are characterized by shoulder straps anchored behind the occupant's head and extending over the occupant's shoulders and down along the upper torso to lower side anchor points adjacent the opposite sides of the seat pan, and by a lap belt extending between the same or adjacent side anchor points across the occupant's lap. In the five point system, the ends of the lap belt and the lower ends of the shoulder strap constitute four separate anchor points and the upper end of the shoulder straps are merged in an inverted Y and are anchored to one point for a total of five anchor locations. In the six anchor point system, the shoulder straps remain separated and are individually attached to two behind-the-head anchors for a total of six anchor locations. A combined shoulder and lap restraint having this basic configuration has been shown to be especially effective in restraining the body under deceleration conditions in such a way as to minimize the tendency of the body to submarine, i.e., slippage of the pelvis region under the lap belt, and in decreasing the potential for lumbar compression, i.e., axial compression of the spine. The five/six point anchor systems have been compared in the foregoing respects with such popular restraint systems as the bandolier configuration formed by a lap belt and a single shoulder strap crossing the upper torso; a three point restraint formed by a lap belt and two shoulder straps that extend from a single behind-the-head anchor and first diverge to pass on opposite sides of the occupant's head and then extend downwardly in a convergent fashion to a center buckle at the mid-point of the lap belt; and a four point restraint that is similar to the above three point system except that the upper ends of the shoulder straps are independently attached to separate anchors located above and behind the occupant's shoulders.

The five/six point anchor systems are also believed to be more reliable than a related restraint configuration that is superficially similar but has only three (or four) anchor points. The latter system is characterized by shoulder straps of continuous lengths of webbing which are slidably looped through non-friction slip fittings on the side anchors and extended in a continuous fashion therefrom inwardly as a lap belt to a lap buckle where the ends of the webbing lengths are releasably connected by the buckle. Because of the slip fittings at the side anchors, the lower ends of the shoulder straps and the opposite ends of the lap belt are not separately anchored and hence this configuration is not a true five or six point anchor system. Free, unrestrained slippage of the webbing at the side anchors allows the lap belt to lengthen under certain force conditions which in turn permits the pelvic region of the body to submarine under the lap belt. On the other hand, excessive tension on the webbing in the region of the shoulder straps is transmitted into tightening of the lap belt, which consequently may become excessively tight and cause injury to the lower stomach or pelvic region.

While it is thus seen that the five/six point anchor systems have certain characteristics which are preferred over other commonly used restraints, previously known implementations of the five and six point restraints have a serious drawback because of their inability to provide quick, tangle-free donning and rapid releases and egress, especially under emergency conditions. Other restraints such as the bandolier and three and four point systems have configurations which lend themselves to the use of a single point release for quick donning and escape, but the five/six point anchor systems are not so readily adapted to a single point release, and heretofore have generally required at least two release locations which militates against rapid release and egress. One implementation of the five/six point restraint systems does use a single point release, located at one of the side anchors for jointly connecting the ends of an adjacent shoulder strap and lap belt to the side anchor. A strap length adjuster on the opposite and nonreleasing shoulder strap is used to snug up the shoulder harness. This particular implementation of the five and six point system, however, has proved difficult to use and has not been widely adopted.

Accordingly, it is an object of the invention to provide an integrated shoulder harness and lap belt restraint of the five/six anchor point type that is relatively easy to don and snug up, and yet can be quickly released and shed for emergency egress. A related object is to provide such a restraint apparatus wherein its operation and use are self-evident and thus does not require independent instruction or explanation in the proper usage.

Another object is to provide an integrated restraint apparatus having the above desirable trains in a configuration that can be economically mass manufactured so as to favor comparably in cost to other combined shoulder harness and lap belt restraints that may not have the effectiveness, safety benefits and rapid release feature afforded by the five/six point anchor restraints.

Still another object of the invention is to provide a five/six point restraint apparatus that meets the foregoing objectives and furthermore is suitable for retrofitting seat installations already equipped with seat belts and the associated seat side anchors.

SUMMARY OF THE INVENTION

The invention is directed to an improvement in an integrated shoulder harness and lap belt restraint apparatus of the five/six point type to provide simplicity of operation, relative ease in donning and snugging the restraint together with a configuration that allows for quick release and shedding of the restraint when needed for emergency egress. Briefly, these features are provided by forming each shoulder strap and an associated portion of the lap belt from a common length of webbing in which such webbing extends downwardly from the occupant's shoulder through a shoulder length adjuster and then is looped through a friction fitting and thence extended inwardly toward a centrally located lap buckle. Each of the complementary buckle parts is provided with a lap belt length adjuster and the webbing extending inwardly from each side anchor is threaded through the corresponding buckle part adjuster and then doubled back with the free end of the same continuous length of webbing which originated at the shoulder strap being fixedly attached to the associated side anchor.

To don the restraint apparatus, the shoulder straps are assumed to be in an oversized or slackened state and the occupant slips the straps over his or her opposite shoulders and then fastens the lap belt, which should also be slack at this stage. Now the belt buckle adjusters are used to tighten the lap belt portion of the restraint by grasping those sections of webbing on opposite sides of the buckle that are looped through the friction fittings on the side anchors and pulling on same in opposed directions and outwardly from the lap buckle so as to snug up the lap belt webbing segments that have their ends fastened to the side anchors. Now the shoulder straps are tightened using the shoulder strap adjusters which takes up the slack in the webbing by pulling the excess through the frictionl fittings.

For rapid egress from the restraint, after it has been secured as above, the occupant releases the lap belt buckle, and a conventional, quick release buckle is provided for this purpose, thereby freeing the doubled segments of webbing joining each buckle part. The webbing segment on each side of the restraint that is looped through the side anchor fittings, is hence free to supply slack to the shoulder straps by slippage through such fittings and hence the occupant now pushes forward on the shoulder straps and slips them outwardly and off the shoulders to be free of the restraint. In other than emergency circumstances, casual egress should be accompanied by loosening the shoulder straps at the shoulder adjusters so as to facilitate subsequent donning of the restraint.

To provide a complete disclosure of the invention, reference is made to the appended drawings and following description of one particular and preferred embodiment.

BRIEF DESCRIPTION OF THE DRAWINGS

FIG. 1 is a front view of the integrated shoulder harness and lap belt restraint apparatus in accordance with the preferred embodiment of the invention, shown in a state prior to installation.

FIG. 2 is an isometric view of the restraint apparatus of FIG. 1 as installed and anchored relative to a seat, and as worn by an occupant.

FIG. 3 is a diagrammatic view of one-half of the restraint apparatus shown in FIGS. 1 and 2, depicting in detail how the webbing cooperates with a shoulder strap adjuster, one part of the lap buckle and the associated side anchor hook and friction-slip fitting.

DETAILED DESCRIPTION

With reference to FIG. 1, the integrated shoulder harness and lap belt restraint apparatus 11 in accordance with the preferred embodiment, is made up of two substantially symmetrical shoulder strap sections 12 and 14, a pair of side anchor hooks 16 and 18, and two double webbing lap belt sections 20 and 22 which extend inwardly toward each other from hooks 16 and 18, respectively, and which are to be joined together by a releasable lap buckle 24. The upper ends of shoulder strap sections 12 and 14 include webbing segments 12a and 14a respectively, that are sewn together in the shape of an inverted Y at a junction 26, which includes a common connective section 28 of webbing. Attached to the end of webbing section 28 is a split ring fastener 30 of a conventional type suitable for being secured to a behind-the-head anchor as described more fully below in connection with FIG. 2. Webbing segments 12a and 14a of the corresponding shoulder strap sections are attached at their lower ends to separate shoulder strap length adjusters 32 and 34 by sewn reentrant attachment loops 36 and 38. The lower ends of adjusters 32 and 34 are cooperatively threaded by the free upper ends of webbing segments 12b and 14b respectively, which constitute the lower portions of the respective shoulder strap sections 12 and 14.

Strap segment 12b is integrated with the lap belt section 20 by being one continuous length of webbing that starts at adjuster 32 and extends downwardly to hook 16 where the webbing is looped through an eye opening 40 of anchor hook 16 and thence extended inwardly as one lap belt segment 20a. The same continuous length of webbing is connected to a tongue part 24a of buckle 24 by threading the webbing through a lap belt length adjuster 42, here formed as in integral component of tongue part 24a. Then the continuous length of webbing is doubled back as another lap belt segment 20b that extends back toward the side anchor hook 16, where the end of the webbing is fixedly attached by an attachment loop 44. Loop 44 is joined to hook 16 through eye opening 40 in a manner that allows the webbing that constitutes shoulder strap segment 12b and lap belt segment 20a to slip through opening 40 when these segments are in a slack condition.

Similarly on the other side of the restraint apparatus 11, a continuous length of webbing commences as the lower shoulder strap segment 14d and is looped through eye opening 50 of side anchor hook 18, and thence extended inwardly as lap belt segment 22a, threaded through an adjuster 52 of the receiver part 24b of buckle 24 and doubled back toward hook 18 as another lap belt segment 22b. The end of segment 22b, and hence the end of the continuous length of webbing constituting segments 24b, 22a and 22b, is fixedly attached to the eye opening 50 of side anchor hook 18 by a sewn reentrant attachment loop 54.

With reference to FIG. 2, a typical installation of restraint apparatus 11 is shown in conjunction with a seat 60 including a seat pan 62 and a seat back 64. Although apparatus 11 may be used generally, in a wide variety of occupant restraint environments, it has particular utility as a restraint for flight attendants on commercial airline carriers. In that environment, there is a need for the restraint apparatus to be not only effective in protecting the flight attendant in crash or sudden acceleration or deceleration conditions, but also it must permit rapid and easy donning and, quick removal in order to allow flight attendants to assist passengers in an emergency.

At the upper extent of the shoulder harness portion of restraint 11, the split ring fastener 30 joined by segment 28 to the inverted Y junction 26, is secured to an anchor bracket 66, located, for example, behind the head or neck of the occupant. From this upper anchor point, and via the inverted Y shaped junction 26, shoulder straps 12 and 14, including adjusters 32 and 34, extend forwardly over the occupant's shoulders and then downwardly along the corresponding sides of the upper torso to lower, side anchor points disposed on opposite sides of seat 60 adjacent and somewhat below seat pan 62. One of such side anchor points is shown as an inverted U shaped anchor bracket 72, to which the associated restraint hook 18 is semi-permanently connected. A like anchor bracket (hidden) is provided on the opposite side of the seat for receiving the connection of anchor hook 16. In the normal use of restraint apparatus 11, fastener 30 at the upper anchor point, and hooks 18 and 16 at the lower side anchor points, remain fastened, and these fasteners are only released for replacement or repair of the restraint apparatus.

Proper installation of apparatus 11 requires that each of the side anchor hooks be oriented, as shown for example by hook 18, so that webbing segment 14b of shoulder strap 14 can be threaded through eye 50 from the side of hook 18 generally adjacent seat 60 such that the continuation segment 22a which emerges from eye 50 and forms one component of lap belt portion 22, is looped outwardly, upwardly and then inwardly over the body of hook 18 as shown. Webbing segment 22a of this half of the lap belt is then threaded through an adjuster 52 of receiver part 24b of buckle 24 (see FIG. 1) and then is passed back to hook 18 as segment 22b, underlying segment 22a. The attachment loop 54 which secures the free end of the continuous length of webbing to eye 50 thus underlies the looped connection of segments 14b and 22a at hook eye 50. A like arrangement exists between webbing segments 12b, 20a and 20b with eye 40 of side anchor hook 16 so that the segment 20a that forms a continuation of the shoulder strap webbing segment 12b, overlies seat belt webbing segment 20b.

The threading of the webbing segments 14b, 22a and 22b through shoulder strap adjuster 34, hook 18 and buckle receiver adjuster 52 is shown in detail by FIG. 3. Note how the segments 14b and 22a are looped through eye opening 50 of hook 18 so that the slippable lap belt segment 22a overlies the anchored lap belt segment 22b. The arrows alongside the webbing segments indicate the directions of web movement to snug the restraint against the body.

OPERATION

Assuming that restraint 11 is initially in a slackened condition, donning proceeds as follows. The user slips his or her shoulder into the harness strap sections 12 and 14 and then pulls the lap belt sections 20 and 22 together and fastens buckle 24.

Now, before attempting to tighten the shoulder harness, the lap restraint is snugged up by grasping the overlying webbing segments 20a and 22a of the doubled webbing seat belt and pulling outwardly, away from buckle 24, on these segments. The adjusters 42 and 52 reactively cause the underlying seat belt webbing segments to tighten across the lap.

As a result of the foregoing operation, the webbing segments 20a and 22a becomes even more slack. These segments however are then snugged up during tightening of the shoulder harness by using adjusters 32 and 34. The free end tabs 33 and 35 of webbing segments 12b and 14b are grasped and pulled downwardly in the usual manner and as a consequence, slack in lower strap segments 12b and 14b and slack in seat belt segments 20a and 22a is taken up, the latter by slippage of the continuous lengths of webbing through eye openings 40 and 50 of hooks 16 and 18, respectively. The snugging operation is now complete. It is observed that once segments 12b, 20a and segments 14b, 22a are taut, then a slight amount of friction at the slippage surfaces associated with eye openings 40 and 50 provide an effective, positive anchoring of the lower ends of shoulder strap segments 12b and 14b as required to achieve the safety advantages of a five/six point restraint system.

To release and shed restraint 11, it is only necessary to unfasten buckle 24 and slide the shoulder harnes off and step out of the seat. The unfastening of buckle 24 causes slack in webbing segments 20a and 22a which is then transmitted to shoulder strap webbing segments 12b and 14b respectively, and hence to shoulder strap sections 12 and 14. Sufficient loosening of strap sections 12 and 14 is obtained in this manner to permit quick and easy egress, such as may be required in an emergency.

When leaving the seat under non-emergency conditions, it is preferable to lengthen all of the webbing segments by operating adjusters 32, 34, 42 and 52 so as to facilitate subsequent donning of the restraint.

While only a particular embodiment has been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. In an integrated shoulder harness and lap restraint apparatus for cooperative arrangement with a seat and associated seat back, and which includes first and second straps that extend forwardly from shoulder harness anchor means located adjacent the seat back so as to pass over opposite shoulders of an occupant and downwardly therefrom along the sides of an occupant's upper torso toward first and second side anchor means respectively located adjacent opposite sides of the seat, and a strap guide provided on each of said anchor means through which the first and second straps are respectively looped for connected to the associated one of said first and second side anchor means, and lap buckle means having first and second complementary buckle parts and having a strap length adjuster on at least said first buckle part, wherein the improvement comprises:

said first and second straps being drawn inwardly from their looped connection with said strap guides on said first and second side anchor means respectively so as to form lap segments of said straps that meet at said lap buckle means;

first and second attachment means for attaching said lap segments of said first and second straps respectively to said first and second buckle parts, said first attachment means comprising means for threading an end of said lap segment of said first strap through said adjuster on said first buckle part; and said end of said lap segment of said first strap being extended from said first buckle part back to said first side anchor means and means provided thereat for fixedly connecting said end of said lap segment of said first strap to said first side anchor means.

2. The improvement set forth in claim 1 wherein said second buckle part has a strap length adjuster and wherein said second attachment means comprises means for threading an end of said lap segment of said second strap through said adjuster on said second buckle part; and said end of said lap segment of said second strap being extended from said second buckle part back to said second side anchor means and means provided thereat for fixedly connecting said end of said lap segment of said second strap to said second side anchor means.

3. The improvement set forth in claim 1 further comprising a first shoulder strap length adjuster means disposed on said first strap between said shoulder harness anchor means and said first side anchor means, whereby the apparatus is donned and tightened by connecting said parts of said buckle means and adjusting the length of a first portion of said lap segment of said first strap that has the end fixedly connected to said first side anchor means by using said adjuster on said first buckle part and then taking up any slack existing in a second portion of said lap segment of said first strap that extends between said first buckle part and the looped connection with said guide on said first side anchor means by using said first shoulder strap adjuster.

4. The improvements set forth in either claim 1 or 2 further comprising second shoulder strap adjuster means disposed on said second strap between said shoulder harness anchor means and said second side anchor means.

5. An integrated shoulder harness and lap restraining apparatus for cooperative arrangement with a shoulder harness anchor means located adjacent an upper portion of a seat back and first and second side anchor means located adjacent opposite sides of a seat and a lap buckle means, comprising:

first and second straps extending forwardly and downwardly from said shoulder harness anchor means, said first and second straps being slidingly connected to said first and second side anchor means respectively and being extended inwardly of a seat from said first and second side anchor means so as to meet and be releasably connected together at and by said lap buckle means; and said lap buckle means having a strap length adjuster on at least a first part thereof, and said first strap being connected to said first part of said buckle means by threading said first strap through said adjuster thereon and thence returning an end of said first strap back to said first side anchor means and including means for providing a fixed connection of the end of said first strap to said first side anchor means so that a first portion of said first strap between said fixed connection to said first side anchor means and said first part of said buckle means is adjustable in length to fit the lap of an occupant and slack occuring in a second portion of said first strap between said first buckle part and the sliding looped connection to said first anchor means is taken up by shortening the length of said first strap between said first side anchor means and said shoulder harness anchor means.

* * * * *